(12) United States Patent
Paul et al.

(10) Patent No.: US 10,025,361 B2
(45) Date of Patent: Jul. 17, 2018

(54) POWER MANAGEMENT ACROSS HETEROGENEOUS PROCESSING UNITS

(71) Applicant: Advanced Micro Devices, Inc., Sunnyvale, CA (US)

(72) Inventors: Indrani Paul, Round Rock, TX (US); Vignesh Trichy Ravi, Austin, TX (US); Manish Arora, Dublin, CA (US); Srilatha Manne, Portland, OR (US)

(73) Assignee: Advanced Micro Devices, Inc., Santa Clara, CA (US)

( * ) Notice: Subject to any disclaimer, the term of this patent is extended or adjusted under 35 U.S.C. 154(b) by 225 days.

(21) Appl. No.: 14/297,208

(22) Filed: Jun. 5, 2014

(65) Prior Publication Data

US 2015/0355692 A1 Dec. 10, 2015

(51) Int. Cl.
| | |
|---|---|
| *G06F 1/00* | (2006.01) |
| *G06F 1/20* | (2006.01) |
| *G06F 1/32* | (2006.01) |
| *G06F 11/30* | (2006.01) |
| *G06F 9/50* | (2006.01) |
| *G06F 11/34* | (2006.01) |

(52) U.S. Cl.
CPC ............ *G06F 1/206* (2013.01); *G06F 1/3203* (2013.01); *G06F 1/324* (2013.01); *G06F 9/5094* (2013.01); *G06F 11/3058* (2013.01); *G06F 11/3409* (2013.01); *G06F 11/3447* (2013.01); *Y02B 60/142* (2013.01)

(58) Field of Classification Search
CPC ...... G06F 1/3203; G06F 1/206; G06F 9/5066; G06F 11/3409
See application file for complete search history.

(56) References Cited

U.S. PATENT DOCUMENTS

| | | | |
|---|---|---|---|
| 2007/0033425 A1* | 2/2007 | Clark ................... | G06F 1/3203 713/320 |
| 2008/0082844 A1* | 4/2008 | Ghiasi ................... | G06F 1/3203 713/323 |

(Continued)

OTHER PUBLICATIONS

Hao Wang et al., "Workload and Power Budget Partitioning for Single-Chip Heterogeneous Processors", PACT'12, Sep. 19, 2012, 10 pages.

(Continued)

*Primary Examiner* — Mohammed H Rehman
*Assistant Examiner* — Gayathri Sampath (57) ABSTRACT

A method includes controlling active frequency states of a plurality of heterogeneous processing units based on frequency sensitivity metrics indicating performance coupling between different types of processing units in the plurality of heterogeneous processing units. A processor includes a plurality of heterogeneous processing units and a performance controller to control active frequency states of the plurality of heterogeneous processing units based on frequency sensitivity metrics indicating performance coupling between different types of processing units in the plurality of heterogeneous processing units. The active frequency state of a first type of processing unit in the plurality of heterogeneous processing units is controlled based on a first activity metric associated with a first type of processing unit and a second activity metric associated with a second type of processing unit.

18 Claims, 5 Drawing Sheets

(56) References Cited

U.S. PATENT DOCUMENTS

| | | | |
|---|---|---|---|
| 2010/0146316 A1* | 6/2010 | Carter | G06F 1/3203 |
| | | | 713/322 |
| 2011/0239006 A1* | 9/2011 | Hsu | G06F 1/3203 |
| | | | 713/300 |
| 2012/0260117 A1* | 10/2012 | Acar | G06F 1/3243 |
| | | | 713/340 |
| 2012/0297232 A1* | 11/2012 | Bircher | G06F 1/324 |
| | | | 713/500 |
| 2013/0007413 A1* | 1/2013 | Thomson | G06F 1/324 |
| | | | 712/30 |
| 2013/0079946 A1* | 3/2013 | Anderson | G06F 1/3228 |
| | | | 700/299 |
| 2014/0082378 A1* | 3/2014 | Schluessler | G06F 1/26 |
| | | | 713/300 |
| 2014/0189413 A1* | 7/2014 | Hasenplaugh | G06F 9/5094 |
| | | | 713/340 |

OTHER PUBLICATIONS

U.S. Appl. No. 13/846,558, filed Mar. 18, 2013, entitled "Global Efficient Application Power Management".

U.S. Appl. No. 14/059,384, filed Oct. 21, 2013, entitled "Cooperative Boosting: Needy Versus Greedy Power Management".

* cited by examiner

POWER MANAGEMENT ACROSS HETEROGENEOUS PROCESSING UNITS

GOVERNMENT LICENSE RIGHTS

This invention was made with government support under Prime Contract Number DE-AC52-07NA27344, Subcontract Number B600716 awarded by DOE. The Government has certain rights in this invention.

FIELD OF THE DISCLOSURE

The disclosed subject matter relates generally to computing systems and, more particularly, to power management across heterogeneous processing units.

DESCRIPTION OF THE RELATED ART

Modern, high-performance processors include multiple heterogeneous processing units, such as central processing unit (CPU) cores and graphics processing unit (GPU) cores. Power management techniques are employed to allocate power adaptively across the processing units to produce the best performance outcome within a fixed processor power and thermal envelope.

The maximum power for a processor (i.e., the thermal design point (TDP)) is set based on running a heavy workload under worst-case conditions. It is an upper bound for the sustainable power draw of the processor and is used to determine the cooling system requirements. Under normal operating conditions, however, not all components are active at the same time or to the same extent, leaving thermal headroom in the system. The thermal headroom may be used to increase the frequency of the active processing units until either the maximum performance state or the thermal limit is reached.

One approach for taking advantage of unused thermal headroom is to boost the frequencies of CPU or GPU cores to improve performance. This approach works in applications where the type of computation dictates the component that requires boosting. For graphics-intensive applications, boosting the GPU is the obvious choice to improve performance, while boosting the CPU is useful for many control-divergent, general-purpose applications. However, for those applications that require cooperative execution of both CPU and GPU cores, these boost algorithms can break down and degrade—rather than improve performance. This breakdown occurs for two reasons: performance coupling and thermal coupling.

Performance coupling refers to control and data dependencies between computations executing on the CPU and GPU cores. For example, for peak GPU utilization, the CPU must provide data to the GPU at a certain rate to sustain GPU performance. Performance coupling between the CPU and GPU cores is accentuated by tighter physical coupling due to on-die integration, shared memory resources, and the emergence of applications that exhibit a more balanced use of the CPU and GPU cores. Thermal coupling refers to the heat exchange that occurs when the CPU and GPU cores share the same die. For example, heat from the CPU cores can accelerate the temperature rise of the GPU. This temperature rise can cause premature throttling of the GPU cores and loss of performance, whereas the absence of thermal coupling may have permitted the GPU to execute at a higher frequency and, hence, higher performance.

BRIEF DESCRIPTION OF THE DRAWINGS

The present disclosure may be better understood, and its numerous features and advantages made apparent to those skilled in the art by referencing the accompanying drawings.

The use of the same reference symbols in different drawings indicates similar or identical items.

DETAILED DESCRIPTION OF EMBODIMENT(S)

FIGS. 1-5 illustrate example techniques for managing resources across heterogeneous processing units. Activity metrics for the different types of processing units may be evaluated to determine frequency sensitivities for the processing units. The activity metrics may also track resources, such as memory, shared by the processing units. The frequency sensitivities evaluate performance coupling across the processing units to determine the effect on overall performance resulting from a change in frequency for an associated processing unit. A processing unit with a high frequency sensitivity contributes strongly to the overall performance, so increasing its frequency generally results in a corresponding increase in performance for the cost associated with an increase in power consumption. In contrast, increasing the frequency of a processing unit with a low frequency sensitivity does little to improve performance, but still results in an increased power consumption. The frequency sensitivities may vary dynamically depending on the current application(s) being implemented by the processing system.

The activity metrics for the different types of processing units may be employed in frequency sensitivity models to determine which types of processing units may benefit from an increase in frequency, or the activity metrics may be used in conjunction with thresholds for considering the frequency sensitivity. The model parameters or thresholds may be varied to determine values that provide an effective frequency adjustment scheme across multiple operating scenarios, thereby capturing the frequency sensitivity of the different types of processing units. The frequency sensitivity metrics may be used to control the frequency states of the processing units to balance performance against power consumption.

Figure 1:
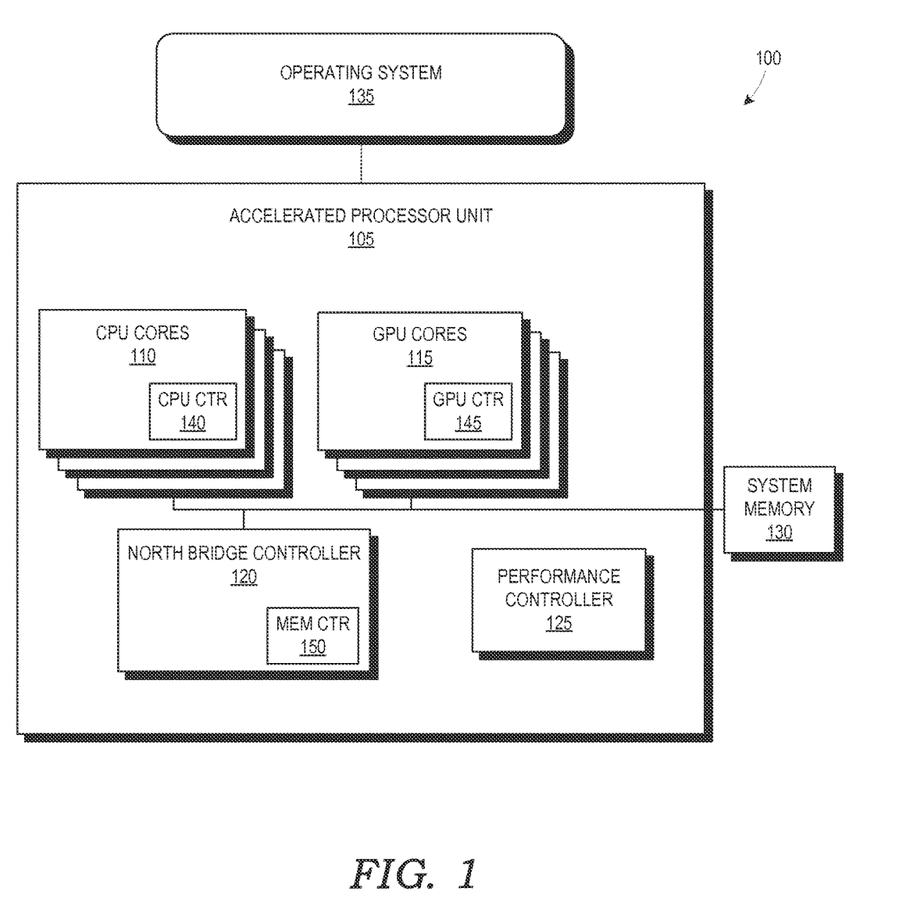
FIG. 1 is a simplified block diagram of a computer system configured to control performance across multiple heterogeneous processing units, according to some embodiments.

FIG. 1 is a block diagram of a computer system 100 including a processor embodied in an accelerated processing unit (APU) 105, in accordance with some embodiments. The APU 105 includes one or more central processing unit (CPU) cores 110, one or more graphics processing unit (GPU) cores 115, a north bridge (NB) controller 120, and a performance controller 125. The NB controller 120 provides an interface to system memory 130. The operation of the computer system 100 is generally controlled by an operating system 135 including software that interfaces with the various elements of the computer system 100. In some embodiments, the APU 105 is employed in a high-performance computing (HPC) environment. The GPU cores are generally employed as accelerators to support HPC workloads. The APU 105 integrates the CPU cores 110 and GPU cores 115 on a common semiconductor die, allowing them to share on-die resources such as the memory hierarchy and interconnect. This integration results in performance dependencies between the CPU cores 110 and the GPU cores 115. For example, CPU and GPU memory accesses interact in the memory hierarchy, and may interfere. Also, due to the common die, the APU 105 implements a chip-level power budget and thermal capacity.

In various embodiments, the computer system 100 may be embodied in a personal computer, a laptop computer, a handheld computer, a tablet computer, a mobile device, a telephone, a personal data assistant ("PDA"), a server, a mainframe, a work terminal, a music player, a smart television, a game console, and the like. To the extent certain example aspects of the computer system 100 are not described herein, such example aspects may or may not be included in various embodiments without limiting the spirit and scope of the embodiments of the present application as would be understood by one of skill in the art.

The performance controller 125 implements dynamic voltage and frequency scaling (DVFS) to adapt voltage and clock levels of the CPU cores 110 and the GPU cores 115 based on the processing demands of the CPU cores 110 and GPU cores 115. As voltage and frequency are generally coupled in the DVFS states (i.e., as voltage decreases, frequency also decreases), the DVFS states may also be referred to as simply active frequency states. The modifier active implies that the processing core 110, 115 remains in an active operational state capable of executing instructions, as compared to an inactive or powered down state where the frequency of the corresponding clock is zero. Table 1 below illustrates exemplary DVFS states for the CPU cores 110. P0-P5 represent software visible states that may be controlled by the operating system 135 or the performance controller 125, and Pb0-Pb1 represent hardware controlled boost states (not visible to software such as the operating system 135) that may be controlled by the performance controller 125. For P0-P5, P0 represents the base DVFS state, and as the state number increases, the voltage and frequency decrease, such that P5 is the lowest DVFS state. The voltages and frequencies associated with the boost states are greater than those of the base state, P0. The boost states Pb1 and Pb1 also exhibit voltages and frequencies that decrease with index number, with Pb0 being the highest boost state.

TABLE 1

CPU DVFS States

|  | P-State | Voltage (V) | Frequency (MHz) |
| --- | --- | --- | --- |
| HW States | Pb0 | V1b | F1b |
|  | Pb1 | V0b | F0b |
| SW-Visible States | P0 | V0 | F0 |
|  | P1 | V1 | F1 |
|  | P2 | V2 | F2 |
|  | P3 | V3 | F3 |
|  | P4 | V4 | F4 |
|  | P5 | V5 | F5 |

The GPU cores 115 have independently controlled power planes that allow voltages and frequencies to be controlled independently from those associated with the CPU cores 110. In the illustrated example, the GPU cores 115 have a GPU-high state (highest frequency), a GPU-med state (medium frequency), and a GPU-low state (lowest frequency).

The CPU cores 110 are homogenous processing units and the GPU cores 115 are homogeneous processing units within their respective groups. In general, homogeneous processing units operate using the same internal architecture and execution model, and the combined performance is essentially scalable based on the number of homogeneous processing units and their DVFS states. As a combined processing resource, the CPU cores 110 and GPU cores 115 represent a plurality of heterogeneous processing units. In contrast to homogeneous processing units, heterogeneous processing units operate using different architectures and execution models, and when considered as a combined processing resource, their performance is not directly scalable. Because there are processing and thermal dependencies between the CPU cores 110 and GPU cores 115, the combined performance is not directly scalable with respect to their DVFS states. The operation of the performance controller 125 for managing the heterogeneous processing units is illustrated as it may be implemented for CPU and GPU coordination, however, it may also be applied to processing complexes including other types of heterogeneous processing units, such as digital signal processors, security processors, Acorn RISC Machine (ARM) processors, application specific integrated circuits (ASICs), etc.

The performance controller 125 configures the DVFS states of the CPU cores 110 and the GPU cores 115 based on their activity levels and thermal constraints. From a thermal constraint viewpoint, the performance controller 125 estimates power consumption for each of the CPU cores 110 and the GPU cores 115 based on their current DVFS states, converts the power estimates into temperature estimates for each component, and assigns power limits to each entity based on a thermal budget. The difference between the current thermal characteristics of the cores 110, 115 and the thermal budget represent thermal headroom that could be used to increase the DVFS state of one or more of the CPU cores 110 or the GPU cores 115.

Conventional power management techniques boost the DVFS states to maximize use of the total thermal capacity, a concept referred to as greedily allocating the power within the thermal budget. If the maximum temperatures associated with the thermal budget is not reached, power is allocated until maximum CPU and GPU frequencies are reached. However, just because the CPU and GPU could run at their maximum frequency does not mean that they should; in some embodiments, there should be a reasonable return in performance for the increase in frequency and higher power consumption.

Rather than using a greedy power allocation algorithm, the performance controller 125 employs frequency sensitivity metrics to provide a measure of the improvement in performance for a unit increase in frequency of the associated core 110, 115. Frequency sensitivity is a time-varying function of the workload of the CPU cores 110 and the GPU cores 115. However, due to performance coupling and thermal coupling of the CPU cores 110 and the GPU cores 115, the workloads cannot be evaluated separately for the homogeneous processing units, but rather, the workloads are evaluated across the heterogeneous cores to account for these dependencies.

Due to the performance coupling between the CPU cores 110 and the GPU cores 115, the frequency sensitivity of the CPU cores 110 is dependent on their workload as well as the workload of the GPU cores 115, and vice versa. In some embodiments, the CPU frequency sensitivity is considered across all of the CPU 110, cores and the GPU frequency sensitivity is considered across all of the GPU cores 115. Also, because the CPU cores 110 and the GPU cores 115 share memory resources via the NB controller 120, the memory workload also affects the frequency sensitivity of both the CPU cores 110 and the GPU cores 115. For example, in an operating scenario where the GPU cores 115 are issuing a high rate of memory references, the overall performance of the APU 105 is memory bandwidth-limited. Thus, the frequency sensitivity of the CPU cores 110 is low, and boosting the CPU cores 110 in this scenario would degrade energy efficiency with little increase in performance.

The GPU cores 115 are especially efficient as execution engines for data-parallel workloads with little control divergence. A GPU core 115 includes multiple single instruction, multiple data (SIMD) units, each having multiple arithmetic logic units (ALUs). However, performance efficiency degrades significantly with increasing control divergence. That does not imply that lower-frequency states should be used for control divergent applications. While ALU utilization and computation may be fairly low, GPU frequency sensitivity is quite high due to the high control flow-divergent behavior that gives rise to the low utilization. However, higher-frequency operation leads to faster re-convergence, and thus shorter execution time.

Each application has phases that vary in their characteristics such that the frequency sensitivities of the CPU cores 110 and the GPU cores 115 change based on their relative activity rates. While computations are offloaded to the GPU cores 110, 115, there are control and data dependencies between computations executing on the CPU cores 110 and the GPU cores 115. For example, for peak utilization of the GPU cores 115, the CPU cores 110 must deliver data to the GPU cores 115 at a certain rate; otherwise, the GPU cores 115 will be idle while they wait for data, resulting in a reduction in overall performance. Such performance-coupling between the CPU cores 110 and the GPU cores 115 is accentuated by the tighter physical coupling due to on-die integration of the CPU cores 110 and the GPU cores 115 and the emergence of applications that attempt a more balanced use of the CPU cores 110 and the GPU cores 115.

To allow the performance controller 125 to evaluate frequency sensitivities for the CPU cores 110 and the GPU cores 115, the APU 105 includes a CPU activity counter 140, a GPU activity counter 145, and a memory activity counter 150. In some embodiments, the CPU cores 110 and the GPU cores 115 may not share the memory subsystem, and the memory activity counter 145 may be omitted. The counters 140, 145, 150 are shown as being distributed to their associated functional entities, however, they may be integrated into the performance controller 125, where the functional entities can push the counter data to the performance controller 125 or the performance controller 125 can poll the functional entities for the counter data. In some embodiments, some functions of the performance controller 125 may be implemented using software (e.g., in the operating system 135). For example, the software may poll the counters 140, 145, 150 and instruct the performance controller 125 how to set the DVFS states of the CPU cores 110 and the GPU cores 115.

There are various activity metrics that may be tracked by the CPU activity counter 140, a GPU activity counter 145, and a memory activity counter 150 to measure the activities levels of their respective functional entities.

In some embodiments, the CPU activity counter 140 tracks clock weighted micro-operations per cycle (UPC), which measures retired micro-operations for all of the CPU cores 110, $\Sigma$(Total no. of retired uops[i]*UnhaltedCoreClocks[i]), per cycle weighted by the total number of active clock cycles of the CPU cores 110, $\Sigma$UnhaltedCoreClocks[i]. For example:

$$ClockWeightedUPC = \frac{\sum(\text{Total no. of retired } uops[i] * UnhaltedCoreClocks[i])}{\sum UnhaltedCoreClocks[i]}$$

To measure GPU activity, the GPU activity counter 145 measures a weighted ALU busy metric in some embodiments. The percentage of GPU time that is used for processing ALU instructions (ALUBusy) is weighted by the GPU utilization (GPUClockBusy), which is the ratio of time when at least one SIMD unit in the GPU core 115 is active compared to the total execution time. For example:

$$WeightedALUBusy = \frac{ALUBusy}{GPUClockBusy}$$

In some embodiments, memory activity is monitored using a global memory utilization metric that considers the aggregated memory bandwidth across all of the CPU cores 110 and 115 cores normalized by a theoretical peak memory bandwidth based on the memory speed (MemoryClockSpeed), data width in bytes per clock (Data Width), and number of channels (TotalMemoryChannels). For example:

$$Global\_MemUtil = \frac{AggregatedMemBW}{TheoreticalPeakMemBW},$$

where

TheoreticalPeakMemBW=(MemoryClockSpeed)*(DataWidth)*(TotalMemoryChannels)

In some embodiments, the CPU, GPU, and memory activity metrics may be combined using linear models to generate composite frequency sensitivity metrics for the CPU cores 110 and the GPU cores 115.

$CPU_{FSEN}=a1*WeightedALUBusy+a2*Global_{MemUtil}+a3*ClockWeighted UPC+k1)$ $GPU_{FSEN}=b1*WeightedALUBusy+b2*Global_{MemUtil}+b3*ClockWeighted UPC+k2)$ The model coefficients a1, a2, a3, k1, b1, b2, b3, k2 for the linear models may be determined using linear regression techniques, piece-wise linear regression, non-linear curve fitting, machine learning, statistical techniques, or the like. A series of test suites including different types of applications with differing control divergence and memory access characteristics may be employed. The model coefficients may be varied to determine the set of coefficients that best determines frequency sensitivity over entire series of test suites.

Based on the CPU and GPU composite frequency sensitivity metrics, the performance controller 125 may allocate power resources to the CPU cores 110 and the GPU cores 115 in a manner that seeks to address both power consumption and performance.

Figure 2:
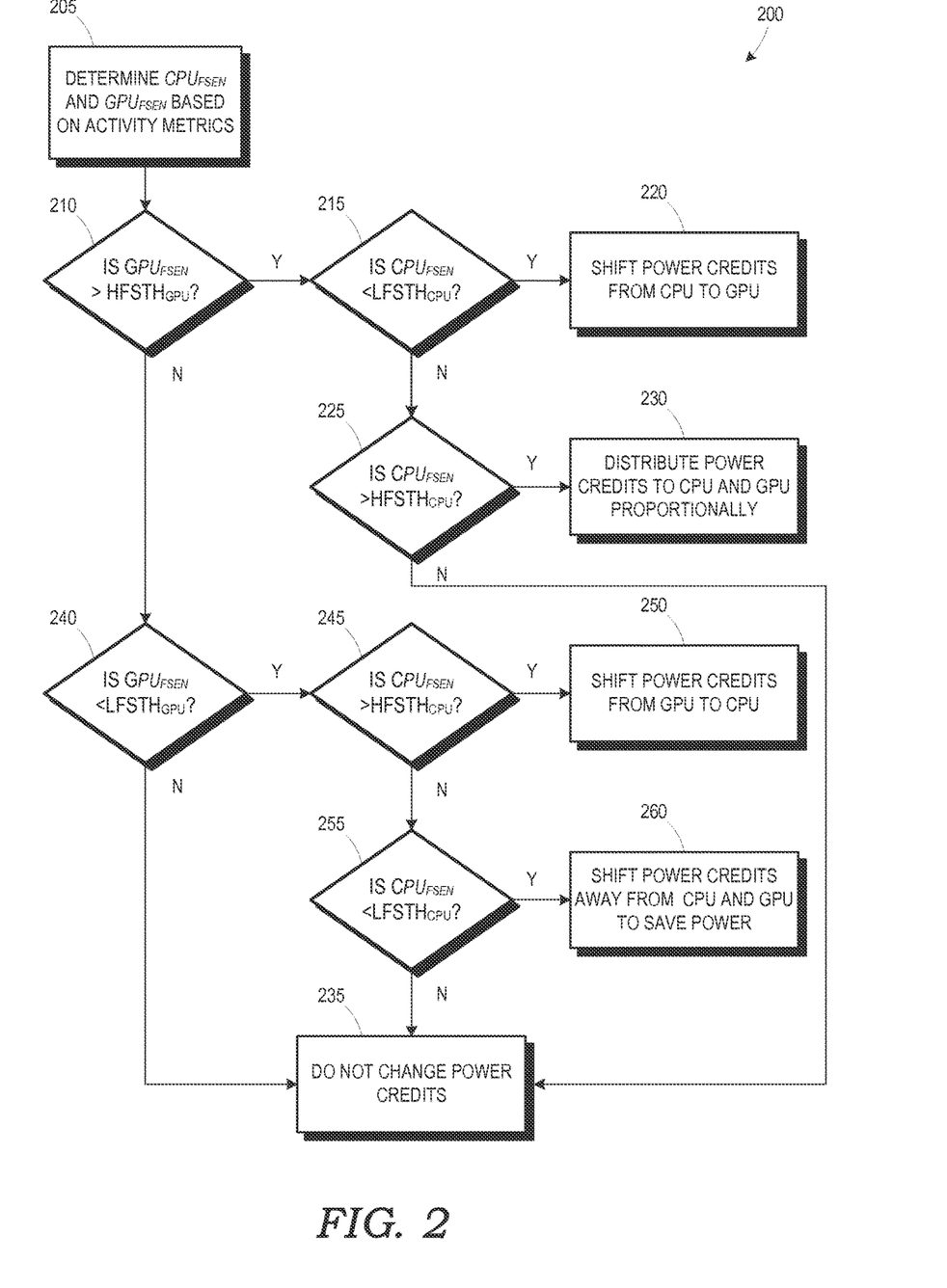
FIGS. 2-4 are flow diagrams of methods for managing resources across heterogeneous processing units, according to some embodiments.

FIG. 2 is a flow diagram of a method 200 for managing resources across heterogeneous processing units, in accordance with some embodiments. For purposes of illustration, it is assumed that the heterogeneous processing units are the CPU cores 110 (referred to collectively in FIG. 2 as CPU) and the GPU cores 115 (referred to collectively in FIG. 2 as GPU). In the general technique of FIG. 2, the CPU and GPU composite frequency sensitivity metrics are compared to thresholds, and the frequency of the CPU may be increased if its composite frequency sensitivity metric is high relative to the composite frequency sensitivity metric of the GPU, and vice versa. In method block 205, the performance controller 125 determines the composite frequency sensitivity metrics, $CPU_{FSEN}$ and $GPU_{FSEN}$ based on the activity metrics measured by the CPU activity counter 140, the GPU activity counter 145, and the memory activity counter 150.

In method block 210, the performance controller 125 determines if the $GPU_{FSEN}$ is greater than a "high" GPU frequency sensitivity threshold, $HFSTH_{GPU}$. If the $GPU_{FSEN}$ is high, the performance controller 125 determines if the $CPU_{FSEN}$ is lower than a "low" CPU frequency sensitivity threshold, $LFSTH_{CPU}$ in method block 215. If the $CPU_{FSEN}$ is low, the performance controller 125 shifts power credits from the CPU to the GPU in method block 220 to allow the frequency of the GPU to be increased. If the $CPU_{FSEN}$ is not low in method block 215, the performance controller 125 determines if the $CPU_{FSEN}$ greater than a "high" CPU frequency sensitivity threshold, $HFSTH_{CPU}$, in method block 225. If the $CPU_{FSEN}$ is high, the performance controller 125 distributes power credits proportionally to the CPU and GPU according in method block 230 to improve performance. If the $CPU_{FSEN}$ is not high in method block 225, no changes are made to the distribution of power credits in method block 235.

If the $GPU_{FSEN}$ is not high in method block 210, the performance controller 125 determines of the $GPU_{FSEN}$ is less than a "low" GPU frequency sensitivity threshold, threshold, $LFSTH_{GPU}$, in method block 240. If the GPUFsEN is not low, the performance controller 125 makes no changes to the power credit distribution in method block 235. If the $GPU_{FSEN}$ is low in method block 240, the performance controller 125 determines if the $CPU_{FSEN}$ is greater than $HFSTH_{CPU}$ in method block 245. If the $CPU_{FSEN}$ is high, the performance controller 125 shifts power credits from the GPU to the CPU in method block 250. If the $CPU_{FSEN}$ is not high in method block 245, the performance controller 125 determines if the $CPU_{FSEN}$ is less than $LFSTH_{CPU}$ in method block 255. If the $CPU_{FSEN}$ is low, the performance controller 125 shifts power credits away from the CPU and the GPU to save power. If the $CPU_{FSEN}$ is not low in method block 255, no changes are made to the distribution of power credits in method block 235.

Note that there is a dead band where no changes are made to the distribution of power credits in method block 235 that occurs when the $CPU_{FSEN}$ and the $GPU_{FSEN}$ are not low or high. The size of the dead band may vary depending on the "high" and "low" thresholds selected. The dead band may be eliminated by setting the low threshold to equate to a value slightly lower than the high threshold, such that the $CPU_{FSEN}$ and the $GPU_{FSEN}$ can only be low or high, not in between.

In some embodiments, the CPU and GPU frequency sensitivities may be evaluated using hardware logic in the performance controller 125 to handle the CPU/GPU performance coupling, as opposed to mathematically calculating the composite frequency sensitivities using the linear models described above. Implementing the sensitivity thresholds using hardware logic reduces computational demands on the performance controller 125. The frequency sensitivities may be accounted for using the values of the CPU activity counter 140, the GPU activity counter 145, and the memory activity counter 150 as well as thresholds.

Figure 3:
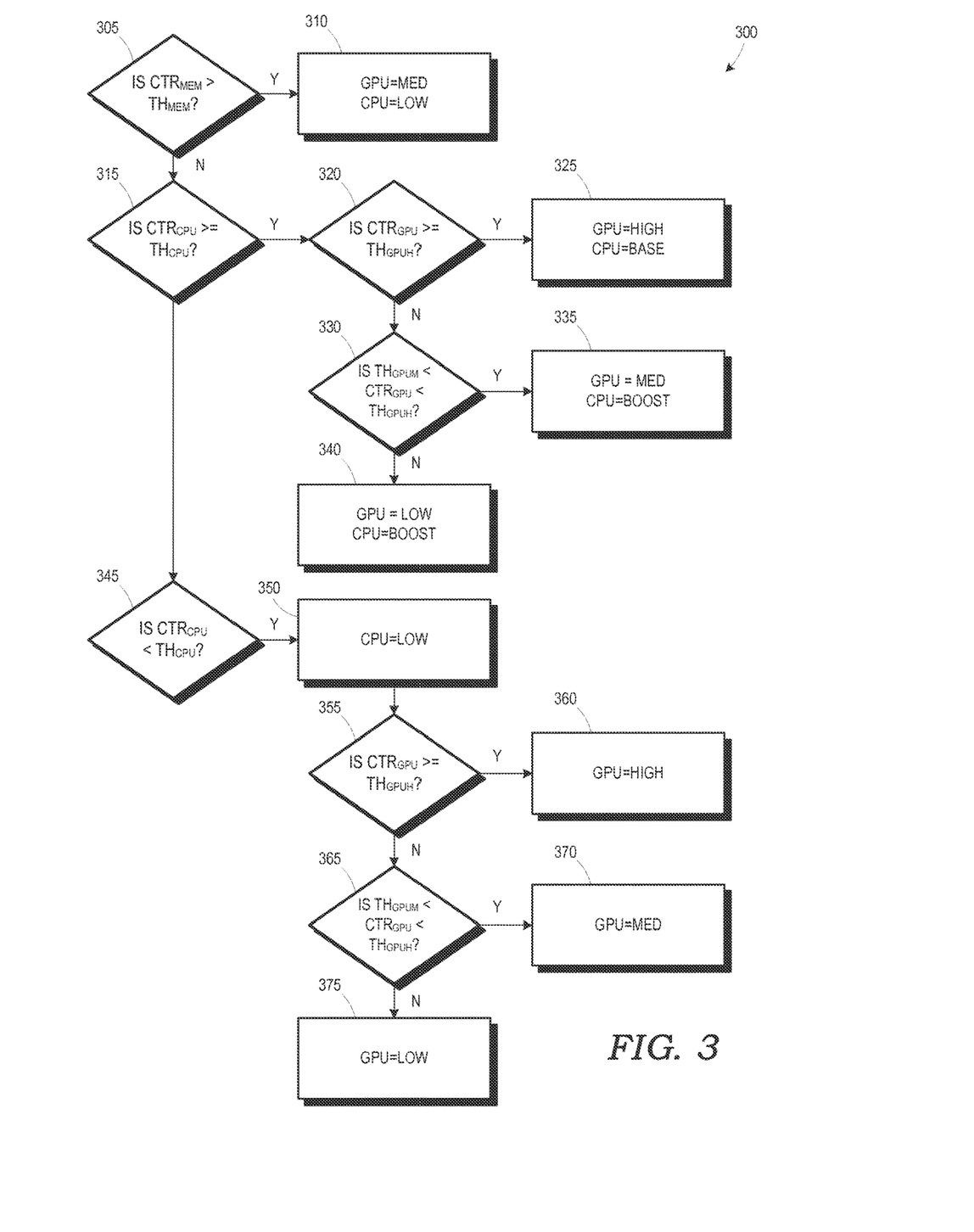

FIG. 3 is a flow diagram of a method 300 for managing resources across heterogeneous processing units, in accordance with some embodiments. For purposes of illustration, it is assumed that the heterogeneous processing units are the CPU cores 110 (referred to collectively in FIG. 3 as CPU) and the GPU cores 115 (referred to collectively in FIG. 3 as GPU). The method 300 may be implemented using hardware logic in the performance controller 125. In the example of FIG. 3, it is assumed that the GPU has LOW, MEDIUM, and HIGH DVFS states, and the CPU has a base DVFS state (e.g., P0), a LOW DVFS state (e.g., P2), and a BOOST DVFS state (e.g., Pb0 or Pb1).

In method block 305, the value of the memory activity counter 150 ($CTR_{MEM}$=Global_MemUtil) is compared to a memory threshold, $TH_{MEM}$, representing the efficiency of the memory bus. If $CTR_{MEM}$ is greater than $TH_{MEM}$ in method block 305, a memory bottleneck is present, and the GPU is set to its MED DVFS state and the CPU is set to a LOW DVFS state in method block 310.

If a memory bottleneck is not present in method block 305, the value of the CPU activity counter 140 ($CTR_{CPU}$=ClockWeightedUPC) is compared to a CPU threshold, $TH_{CPU}$. If $CTR_{CPU}$ is greater than or equal to $TH_{CPU}$ in method block 315, the CPU is frequency sensitive, and the GPU sensitivity is determined by comparing the value of the GPU activity counter 145 ($CTR_{GPU}$=Weighted ALUBusy) to a high threshold for GPU activity, $TH_{GPUH}$, in method block 320. If $CTR_{GPU}>=TH_{GPUH}$ in method block 320, the GPU frequency sensitivity is high. The GPU is set to its HIGH DVFS state and the CPU is set to its BASE DVFS state in method block 325.

If the GPU frequency sensitivity is not high in method block 320, the GPU activity is compared to a medium threshold, $TH_{GPUM}$, and the high threshold, $TH_{GPUH}$, in method block 330. If the GPU activity is between medium and high in method block 330, the GPU is set to its MED DVFS state and the CPU is set to a BOOST DVFS state in method block 335. If the GPU activity is not at least medium in method block 330, the GPU is frequency insensitive. The GPU is set to its LOW DVFS state and the CPU is set to a BOOST DVFS state in method block 340.

If $CTR_{CPU}$ is less than THcpu in method block 345, the CPU is frequency insensitive, and the CPU is set to a LOW DVFS state in method block 350. There is not an "N" exit path from method block 345 because method blocks 315 and 345 are all inclusive. In method block 355, the GPU activity is considered by comparing $CTR_{GPU}$ to $TH_{GPUH}$. If $CTR_{GPU}>=TH_{GPUH}$ the GPU frequency sensitivity is high, and the GPU is set to its HIGH DVFS state in method block 360. If the GPU frequency sensitivity is not high in method block 355, the GPU activity is compared to the medium threshold, $TH_{GPUM}$, and the high threshold, $TH_{GPUH}$, in method block 365. If the GPU activity is between medium and high in method block 355, the GPU is set to its MED DVFS state in method block 370. If the GPU activity is not at least medium in method block 365, the GPU is frequency insensitive. The GPU is set to its LOW DVFS state in method block 375.

Figure 4:
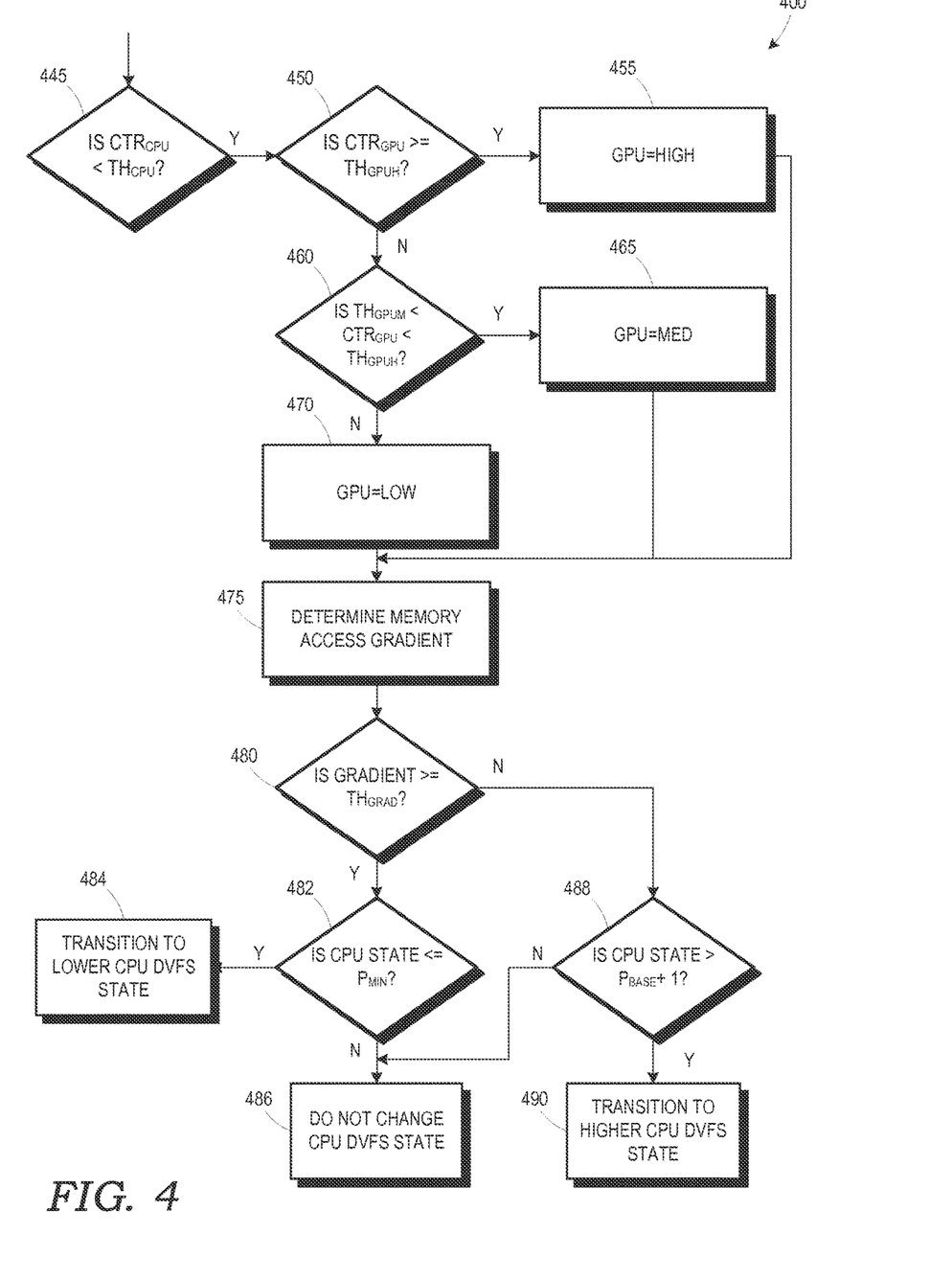

In the example of FIG. 3, the CPU was constrained such that it did not use all of its low power DVFS states to favor performance over power savings. FIG. 4 is a flow diagram of a method 400 for managing resources across heterogeneous processing units, in accordance with some embodiments. In the method 400, a more aggressive approach is used to allow the CPU to access additional low power DVFS states. The performance controller 125 analyzes gradients in memory access rates to determine the appropriate DVFS state. The technique of FIG. 4 includes method blocks 305-345 of FIG. 3. Method block 445 in FIG. 4 corresponds to method block 345 of FIG. 3.

If $CTR_{CPU}$ is less than $TH_{CPU}$ in method block 445, the CPU is frequency insensitive. In method block 450, the GPU activity is considered by comparing $CTR_{GPU}$ to $TH_{GPUH}$. If $CTR_{GPU}>=TH_{GPUH}$ the GPU frequency sensitivity is high, and the GPU is set to its HIGH DVFS state in method block 455. If the GPU frequency sensitivity is not high in method block 450, the GPU activity is compared to the medium threshold, $TH_{GPUM}$, and the high threshold, $TH_{GPUH}$, in method block 460. If the GPU activity is between medium and high in method block 460, the GPU is set to its MED DVFS state in method block 465. If the GPU activity is not at least medium in method block 460, the GPU is frequency insensitive. The GPU is set to its LOW DVFS state in method block 470.

After the GPU DVFS state is sent in one of method blocks 455, 465, or 470, the method 400 transitions to method block 475, where a memory access gradient is calculated. In some embodiments, the memory access gradient is calculated by comparing a count of memory accesses by the CPU and the GPU over a current time interval to a number of memory accesses from a previous time interval to determine the change in the memory access counts. A negative memory access gradient may be indicative of GPU data starvation, while a positive memory access gradient greater than the threshold may indicate that the CPU has excess capacity. If the determined memory gradient is greater than or equal to a threshold, $TH_{GRAD}$, in method block 480, the CPU DVFS state is compared to a minimum DVFS state, $P_{MIN}$, in method block 482. In some embodiments, the minimum DVFS threshold may be P5 in Table 1, while in other embodiments, the minimum DVFS threshold may correspond to a higher DVFS state. If the current state is less than or equal to $P_{MIN}$ in method block 482, the CPU is transitioned to a lower DVFS state in method block 484. If the CPU is already at its minimum DVFS state in method block 482, the DVFS state remains unchanged as indicated in method block 486.

If the memory access gradient does not exceed the threshold in method block 480 (indicative of GPU starvation), the CPU DVFS state is evaluated in method block 488 to determine if it is higher than its base state, $P_{BASE}$, plus one. If the current CPU state exceeds the base state plus one in method block 488, the CPU is transitioned to a higher DVFS state to attempt to increase GPU performance. If the current CPU state does not exceed the base state plus one in method block 488, no changes are made to the CPU DVFS state as indicated in method block 486. Allowing the CPU to lower its DVFS states, as illustrated in FIG. 4, has the potential to provide power savings, but may result in performance degradation, depending on the particular characteristics of the application being executed. At lower levels of CPU-GPU coupling, the use of the lower DVFS states allows power savings with little performance degradation. However, if significant coupling is present, performance degradation is increased compared to the technique illustrated in FIG. 3, where the low power DVFS state for the CPU is limited to P2.

The control techniques illustrated in FIGS. 2, 3, and 4 allow the CPU/GPU coupling to be evaluated and considered in the selection of the DVFS states for the CPU cores 110 and the GPU cores 115. The model coefficients in the technique of FIG. 2, or the thresholds in the techniques of FIGS. 3 and 4 may be varied to capture performance coupling across the plurality of heterogeneous processing units and thereby facilitate changes to the DVFS states based on frequency sensitivity. In this manner, power savings may be achieved while limiting performance degradation. The CPU cores 110 and/or GPU cores 115 may be boosted within the thermal envelope if doing so has the potential to increase performance. If the CPU and/or GPU frequency sensitivities do not indicate transitioning to a higher DVFS state will increase performance, the transition can be avoided, and power savings can be achieved.

In some embodiments, at least some of the functionality described above may be implemented by one or more processors executing one or more software programs tangibly stored at a computer readable medium, and whereby the one or more software programs comprise instructions that, when executed, manipulate the one or more processors to perform one or more functions of the processing system described above. Further, in some embodiments, serial data interfaces described above are implemented with one or more integrated circuit (IC) devices (also referred to as integrated circuit chips). Electronic design automation (EDA) and computer aided design (CAD) software tools may be used in the design and fabrication of these IC devices. These design tools typically are represented as one or more software programs. The one or more software programs comprise code executable by a computer system to manipulate the computer system to operate on code representative of circuitry of one or more IC devices so as to perform at least a portion of a process to design or adapt a manufacturing system to fabricate the circuitry. This code can include instructions, data, or a combination of instructions and data. The software instructions representing a design tool or fabrication tool typically are stored in a computer readable storage medium accessible to the computing system. Likewise, the code representative of one or more phases of the design or fabrication of an IC device may be stored in and accessed from the same computer readable storage medium or a different computer readable storage medium.

A computer readable storage medium may include any storage medium, or combination of storage media, accessible by a computer system during use to provide instructions and/or data to the computer system. Such storage media can include, but are not limited to, optical media (e.g., compact disc (CD), digital versatile disc (DVD), or Blu-Ray disc), magnetic media (e.g., floppy disc, magnetic tape, or magnetic hard drive), volatile memory (e.g., random access memory (RAM) or cache), non-volatile memory (e.g., read-only memory (ROM) or Flash memory), or microelectromechanical systems (MEMS)-based storage media. The computer readable storage medium may be embedded in the computing system (e.g., system RAM or ROM), fixedly attached to the computing system (e.g., a magnetic hard drive), removably attached to the computing system (e.g., an optical disc or Universal Serial Bus (USB)-based Flash memory), or coupled to the computer system via a wired or wireless network (e.g., network accessible storage (NAS)).

Figure 5:
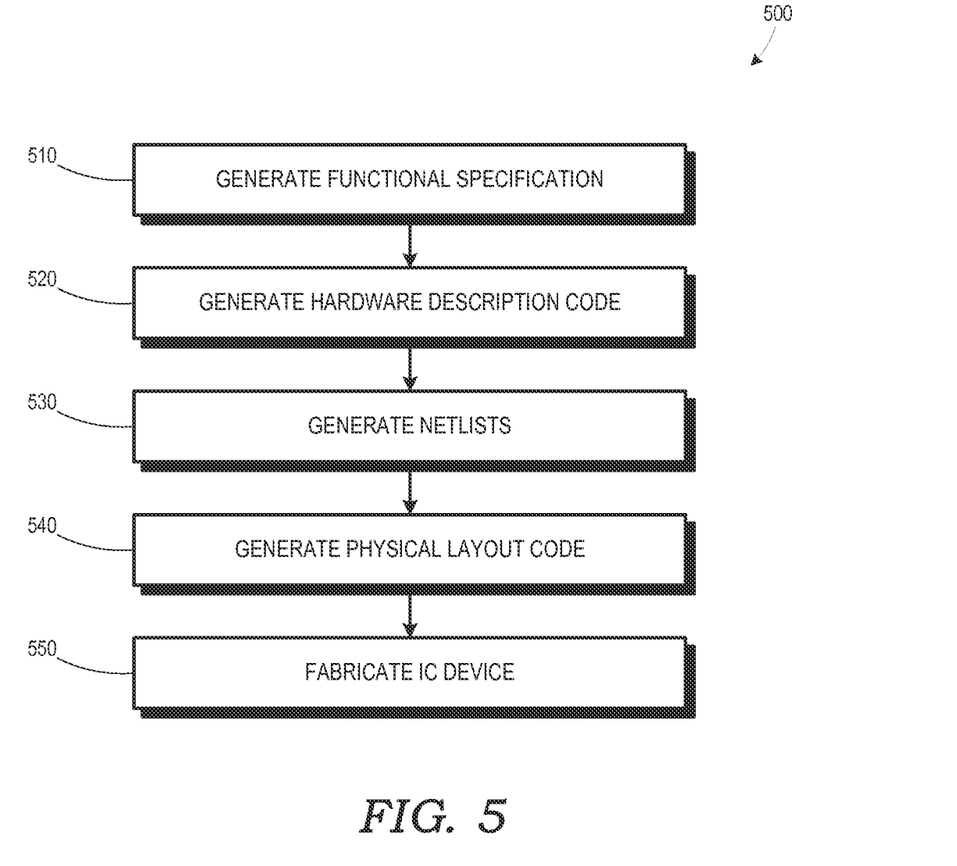
FIG. 5 is a flow diagram illustrating a method for designing and fabricating an integrated circuit device implementing at least a portion of a component of a processor, according to some embodiments.

FIG. 5 is a flow diagram illustrating an example method 500 for the design and fabrication of an IC device implementing one or more aspects in accordance with some embodiments. As noted above, the code generated for each of the following processes is stored or otherwise embodied in computer readable storage media for access and use by the corresponding design tool or fabrication tool.

At block 510 a functional specification for the IC device is generated. The functional specification (often referred to as a micro architecture specification (MAS)) may be represented by any of a variety of programming languages or modeling languages, including C, C++, SystemC, Simulink, or MATLAB.

At block 520, the functional specification is used to generate hardware description code representative of the hardware of the IC device. In some embodiments, the hardware description code is represented using at least one Hardware Description Language (HDL), which comprises any of a variety of computer languages, specification languages, or modeling languages for the formal description and design of the circuits of the IC device. The generated HDL code typically represents the operation of the circuits of the IC device, the design and organization of the circuits, and tests to verify correct operation of the IC device through simulation. Examples of HDL include Analog HDL (AHDL), Verilog HDL, SystemVerilog HDL, and VHDL. For IC devices implementing synchronized digital circuits, the hardware descriptor code may include register transfer level (RTL) code to provide an abstract representation of the operations of the synchronous digital circuits. For other types of circuitry, the hardware descriptor code may include behavior-level code to provide an abstract representation of the circuitry's operation. The HDL model represented by the hardware description code typically is subjected to one or more rounds of simulation and debugging to pass design verification.

After verifying the design represented by the hardware description code, at block 530 a synthesis tool is used to synthesize the hardware description code to generate code representing or defining an initial physical implementation of the circuitry of the IC device. In some embodiments, the synthesis tool generates one or more netlists comprising circuit device instances (e.g., gates, transistors, resistors, capacitors, inductors, diodes, etc.) and the nets, or connections, between the circuit device instances. Alternatively, all or a portion of a netlist can be generated manually without the use of a synthesis tool. As with the hardware description code, the netlists may be subjected to one or more test and verification processes before a final set of one or more netlists is generated.

Alternatively, a schematic editor tool can be used to draft a schematic of circuitry of the IC device and a schematic capture tool then may be used to capture the resulting circuit diagram and to generate one or more netlists (stored on a computer readable media) representing the components and connectivity of the circuit diagram. The captured circuit diagram may then be subjected to one or more rounds of simulation for testing and verification.

At block 540, one or more EDA tools use the netlists produced at block 530 to generate code representing the physical layout of the circuitry of the IC device. This process can include, for example, a placement tool using the netlists to determine or fix the location of each element of the circuitry of the IC device. Further, a routing tool builds on the placement process to add and route the wires needed to connect the circuit elements in accordance with the netlist(s). The resulting code represents a three-dimensional model of the IC device. The code may be represented in a database file format, such as, for example, the Graphic Database System II (GDSII) format. Data in this format typically represents geometric shapes, text labels, and other information about the circuit layout in hierarchical form.

At block 550, the physical layout code (e.g., GDSII code) is provided to a manufacturing facility, which uses the physical layout code to configure or otherwise adapt fabrication tools of the manufacturing facility (e.g., through mask works) to fabricate the IC device. That is, the physical layout code may be programmed into one or more computer systems, which may then control, in whole or part, the operation of the tools of the manufacturing facility or the manufacturing operations performed therein.

As disclosed herein, in some embodiments a method includes controlling active frequency states of a plurality of heterogeneous processing units based on frequency sensitivity metrics indicating performance coupling between different types of processing units in the plurality of heterogeneous processing units. The active frequency state of a first type of processing unit in the plurality of heterogeneous processing units is controlled based on a first activity metric associated with a first type of processing unit and a second activity metric associated with a second type of processing unit.

As disclosed herein, in some embodiments a processor includes a plurality of heterogeneous processing units and a performance controller to control active frequency states of the plurality of heterogeneous processing units based on frequency sensitivity metrics indicating performance coupling between different types of processing units in the plurality of heterogeneous processing units. The performance controller is to control an active frequency state of a first type of processing unit in the plurality of heterogeneous processing units based on a first activity metric associated with a first type of processing unit and a second activity metric associated with a second type of processing unit.

As disclosed herein, in some embodiments a non-transitory computer readable media stores code to adapt at least one computer system to perform a portion of a process to fabricate at least part of a processor. The processor includes a plurality of heterogeneous processing units and a performance controller to control active frequency states of the plurality of heterogeneous processing units based on frequency sensitivity metrics indicating performance coupling between different types of processing units in the plurality of heterogeneous processing units. The performance controller is to control an active frequency state of a first type of processing unit in the plurality of heterogeneous processing units based on a first activity metric associated with a first type of processing unit and a second activity metric associated with a second type of processing unit.

As disclosed herein, in some embodiments a processor includes at least one central processing unit core, at least one graphics processing unit core, a memory coupled to the at least one central processing unit core and the at least one graphics processing unit core, and a performance controller. The performance controller is to control active frequency states of the at least one central processing unit core and the at least one graphics processing unit frequency sensitivity metrics indicating performance coupling between the at least one central processing unit core and the at least one graphics processing unit core, wherein the frequency sensitivity metrics include a central processing unit activity metric, a graphic processing unit activity metric, and a memory activity metric. The performance controller is to control an active frequency state of the at least one central processing unit based on the central processing unit activity metric, the graphic processing unit activity metric, and the memory activity metric.

Note that not all of the activities or elements described above in the general description are required, that a portion of a specific activity or device may not be required, and that one or more further activities may be performed, or elements included, in addition to those described. Still further, the order in which activities are listed are not necessarily the order in which they are performed.

Also, the concepts have been described with reference to specific embodiments. However, one of ordinary skill in the art appreciates that various modifications and changes can be made without departing from the scope of the present disclosure as set forth in the claims below. Accordingly, the specification and figures are to be regarded in an illustrative rather than a restrictive sense, and all such modifications are intended to be included within the scope of the present disclosure.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims.

What is claimed is:

1. A method, comprising:
    generating, at a performance controller of a processor, a first composite frequency sensitivity metric for a first type of processing unit of the processor based on a first activity metric associated with the first type of processing unit and a second activity metric associated with a second type of processing unit of the processor and a first set of model coefficients for weighting the first and second activity metrics;
    generating, at the performance controller, a second composite frequency sensitivity metric for the second type of processing unit based on the first and second activity metrics and a second set of model coefficients for weighting the first and second activity metrics; and
    controlling, at the performance controller, active frequency states of a plurality of heterogeneous processing units based on the first and second composite frequency sensitivity metrics, wherein the first and second composite frequency sensitivity metrics indicate performance coupling between different types of processing units in the plurality of heterogeneous processing units,
    wherein:
        performance coupling comprises control and data dependencies between workloads executing on the plurality of heterogeneous processing units, each of the first and second composite frequency sensitivity metrics is dependent upon workloads across two or more performance-coupled processing units of the plurality of heterogeneous processing units, and the active frequency state of the first type of processing unit in the plurality of heterogeneous processing units is controlled based on the first activity metric associated with the first type of processing unit and the second activity metric associated with the second type of processing unit, wherein the first and second activity metrics are based in part on the performance coupling.

2. The method of claim 1, wherein the first type of processing unit comprises a central processing unit core, and the second type of processing unit comprises a graphics processing unit core.

3. The method of claim 1, wherein the active frequency state of the first type of processing unit is controlled based on a memory activity metric associated with a memory shared by the plurality of heterogeneous processing units.

4. The method of claim 1, further comprising:
    setting the first type of processing unit to a base active frequency state and the second type of processing unit to a high active frequency state responsive to the first activity metric exceeding a first threshold and the second activity metric exceeding a second threshold; and
    setting the first type of processing unit to a boost active frequency state higher than the base active frequency state responsive to the first activity metric exceeding the first threshold and the second activity metric not exceeding the second threshold.

5. The method of claim 1, further comprising:
    setting the first type of processing unit to a low active frequency state responsive to the first activity metric not exceeding a first threshold and controlling the active frequency state of the second type of processing unit based on the second activity metric.

6. The method of claim 1, further comprising:
    controlling the active frequency state of the first type of processing unit based on a memory gradient metric associated with memory accesses to a memory shared by the plurality of heterogeneous processing units responsive to the first activity metric not exceeding a first threshold; and
    controlling the active frequency state of the second type of processing unit based on the second activity metric.

7. The method of claim 1, further comprising generating the first and second composite frequency sensitivity metrics based on a memory activity metric associated with a memory shared by the plurality of heterogeneous processing units.

8. The method of claim 1, wherein controlling the active frequency states comprises increasing a frequency of the first type of processing unit responsive to the first composite frequency sensitivity metric being higher than the second composite frequency sensitivity metric.

9. A processor, comprising:
    a plurality of heterogeneous processing units; and
    a performance controller to
        generate a first composite frequency sensitivity metric for a first type of processing unit based on a first activity metric associated with the first type of processing unit and a second activity metric associated with a second type of processing unit and a first set of model coefficients for weighting the first and second activity metrics;
        generate a second composite frequency sensitivity metric for the second type of processing unit based on the first and second activity metrics and a second set of model coefficients for weighting the first and second activity metrics; and
        control active frequency states of the plurality of heterogeneous processing units based on the first and second composite frequency sensitivity metrics, wherein the first and second composite frequency sensitivity metrics indicate performance coupling between different types of processing units in the plurality of heterogeneous processing units,
    wherein
        performance coupling comprises control and data dependencies between workloads executing on the plurality of heterogeneous processing units, each of the first and second composite frequency sensitivity metrics is dependent upon workloads across two or more performance-coupled processing units of the plurality of heterogeneous processing units, and the performance controller is to control an active frequency state of the first type of processing unit in the plurality of heterogeneous processing units based on the first activity metric associated with the first type of processing unit and the second activity metric associated with the second type of processing unit.

10. The processor of claim 9, wherein the first type of processing unit comprises a central processing unit core, and the second type of processing unit comprises a graphics processing unit core.

11. The processor of claim 9, further comprising a memory shared by the plurality of heterogeneous processing units, wherein the first and second composite frequency sensitivity metrics comprise a memory activity metric.

12. The processor of claim 9, wherein the performance controller is to:
    set the first type of processing unit to a base active frequency state and the second type of processing unit to a high active frequency state responsive to the first activity metric exceeding a first threshold and the second activity metric exceeding a second threshold; and
    set the first type of processing unit to a boost active frequency state higher than the base active frequency state responsive to the first activity metric exceeding the first threshold and the second activity metric not exceeding the second threshold.

13. The processor of claim 9, wherein the performance controller is to set the first type of processing unit to a low active frequency state responsive to the first activity metric not exceeding a first threshold and control the active frequency state of the second type of processing unit based on the second activity metric.

14. The processor of claim 9, wherein the performance controller is to control the active frequency state of the first type of processing unit based on a memory gradient metric associated with memory accesses to a memory shared by the plurality of heterogeneous processing units responsive to the first activity metric not exceeding a first threshold and control the active frequency state of the second type of processing unit based on the second activity metric.

15. The processor of claim 9, further comprising a memory shared by the plurality of heterogeneous processing units, wherein the performance controller is to generate the first and second composite frequency sensitivity metrics based on a memory activity metric associated with the memory.

16. The processor of claim 9, wherein the performance controller is to increase a frequency of the first type of processing unit responsive to the first composite sensitivity metric being higher than the second composite frequency sensitivity metric.

17. A processor, comprising:
    at least one central processing unit core;
    at least one graphics processing unit core;
    a memory coupled to the at least one central processing unit core and the at least one graphics processing unit core; and
    a performance controller to
        generate a first composite sensitivity metric for a first type of processing unit based on a first activity metric associated with the first type of processing unit and a second activity metric associated with a second type of processing unit and a first set of model coefficients for weighting the first and second activity metrics;
        generate a second composite sensitivity metric for the second type of processing unit based on the first and second activity metrics and a second set of model coefficients for weighting the first and second activity metrics; and
        control an active frequency state of the at least one central processing unit core and the at least one graphics processing unit core based on the first and second composite frequency sensitivity metrics, wherein the first and second composite frequency sensitivity metrics indicate performance coupling between the at least one central processing unit core and the at least one graphics processing unit core, wherein performance coupling comprises control and data dependencies between workloads executing on the at least one central processing unit core and the at least one graphics processing unit core, wherein the first and second composite frequency sensitivity metrics include a central processing unit activity metric, a graphic processing unit activity metric, and a memory activity metric, wherein each one of the central processing unit activity metric, the graphic processing unit activity metric, and the memory activity metric is dependent upon workloads across both the at least one performance-coupled central processing unit and graphics processing unit cores, and further wherein the performance controller is to control an active frequency state of the at least one central processing unit core based on the central processing unit activity metric, the graphic processing unit activity metric, and the memory activity metric.

18. The processor of claim 17, wherein the performance controller is to control an active frequency state of the at least one graphics processing unit core based on the central processing unit activity metric, the graphic processing unit activity metric, and the memory activity metric.

* * * * *